(12) United States Patent
Mantell et al.

(10) Patent No.: US 9,242,455 B2
(45) Date of Patent: Jan. 26, 2016

(54) SYSTEM AND METHOD FOR TRANSFIXING AN AQUEOUS INK IN AN IMAGE TRANSFER SYSTEM

(71) Applicant: Xerox Corporation, Norwalk, CT (US)

(72) Inventors: David A. Mantell, Rochester, NY (US); Chu-heng Liu, Penfield, NY (US); Srinivas Mettu, Essendon (AU); Anthony S. Condello, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 181 days.

(21) Appl. No.: 13/943,473

(22) Filed: Jul. 16, 2013

(65) Prior Publication Data

US 2015/0022605 A1    Jan. 22, 2015

(51) Int. Cl.
*B41J 2/01* (2006.01)
*B41J 2/005* (2006.01)
(Continued)

(52) U.S. Cl.
CPC ............ *B41J 2/0057* (2013.01); *B41M 5/0017* (2013.01); *B41M 5/0256* (2013.01); *B41M 5/03* (2013.01); *B41M 5/5218* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41M 5/0011; B41M 5/0017; B41M 7/00; B41M 7/0072; B41M 5/52; B41M 5/5218; C09D 11/36; C09D 11/40; C09D 11/30; C09D 11/38; C09D 11/322; C09D 11/328; C09D 11/101; C09D 11/005; C09D 11/54; C09D 11/52

USPC .................. 347/100, 95, 103, 96, 88, 99, 21; 106/31.6, 31.13, 31.27; 523/160, 161
See application file for complete search history.

(56) References Cited

U.S. PATENT DOCUMENTS 6,196,674 B1    3/2001    Takemoto
6,357,870 B1    3/2002    Beach et al.
(Continued)

FOREIGN PATENT DOCUMENTS

EP    2 042 325 A2    4/2009

OTHER PUBLICATIONS

European Search Report corresponding to European Patent Application No. 14175425.9; European Patent Office, Munich, Germany; May 12, 2014 (9 pages).

*Primary Examiner* — Manish S Shah
(74) *Attorney, Agent, or Firm* — Maginot Moore & Beck LLP

(57) ABSTRACT

An image transfer medium for transferring an ink image onto a substrate is provided on its surface with a layer of particles that include an aggregation treatment agent capable of crashing out colorants, latex and/or resin in the liquid ink. A method for transferring an ink image includes providing an image transfer medium; applying a layer of particles to the image transfer medium, the particles including an aggregation treatment agent capable of crashing out colorants, latex and/or resin in liquid ink; applying liquid ink drops to the image transfer medium; initiating crashing of the colorant, latex and/or resin in the ink drops upon contact with the particles; and upon a sufficient amount of aggregation and drying, contacting a second substrate to the image transfer medium to transfer the ink from the transfer medium to the second substrate.

11 Claims, 3 Drawing Sheets

(51) Int. Cl.
  *B41M 5/00* (2006.01)
  *B41M 5/025* (2006.01)
  *B41M 5/03* (2006.01)
  *B41M 5/52* (2006.01)

(56) References Cited

U.S. PATENT DOCUMENTS

| | | | |
|---|---|---|---|
| 6,365,318 B1 | 4/2002 | Moffat et al. | |
| 6,974,609 B2 | 12/2005 | Engle et al. | |
| 7,281,790 B2 | 10/2007 | Mouri et al. | |
| 7,419,257 B2 | 9/2008 | Mouri et al. | |
| 7,494,213 B2 | 2/2009 | Taniuchi et al. | |
| 7,530,683 B2 | 5/2009 | Bauer | |
| 7,661,809 B2 | 2/2010 | Taniuchi et al. | |
| 7,712,890 B2 | 5/2010 | Yahiro | |
| 7,780,286 B2 | 8/2010 | Yahiro | |
| 7,845,786 B2 | 12/2010 | Konno | |
| 7,876,345 B2 | 1/2011 | Houjou | |
| 8,042,906 B2 | 10/2011 | Chiwata et al. | |
| 8,220,917 B2 | 7/2012 | Taniuchi et al. | |
| 8,226,225 B2 | 7/2012 | Yamanobe | |
| 8,287,117 B2 | 10/2012 | Ageishi | |
| 2005/0110855 A1* | 5/2005 | Taniuchi et al. | 347/103 |
| 2008/0006176 A1 | 1/2008 | Houjou | |
| 2008/0062241 A1* | 3/2008 | Yamashita et al. | 347/224 |
| 2009/0041933 A1 | 2/2009 | Aida et al. | |
| 2009/0084311 A1 | 4/2009 | Yoshida et al. | |
| 2009/0085960 A1 | 4/2009 | Yahiro et al. | |
| 2009/0091610 A1 | 4/2009 | Doi et al. | |
| 2010/0245511 A1* | 9/2010 | Ageishi | 347/102 |
| 2010/0295890 A1 | 11/2010 | Taniuchi | |
| 2011/0141188 A1 | 6/2011 | Morita | |
| 2012/0105562 A1 | 5/2012 | Sekiguchi et al. | |
| 2012/0127250 A1* | 5/2012 | Kanasugi et al. | 347/103 |

* cited by examiner

SYSTEM AND METHOD FOR TRANSFIXING AN AQUEOUS INK IN AN IMAGE TRANSFER SYSTEM

TECHNICAL FIELD

The present disclosure relates to printing, copying and image transfer machines, marking engines and the like. In particular the disclosure relates to liquid or aqueous ink transfer systems and methods for such machines.

BACKGROUND

In certain indirect printing systems, an ink image is applied onto an image transfer medium, and this image is then transferred to a second substrate, typically without the application of heat. The image can be transferred using minimal or low pressure applied to the back surface of the transfer medium, after which the medium is removed. The first step in the transfix process requires printing the liquid ink onto the image transfer medium, which typically occurs by directing ink droplets onto the surface of the medium. In this step it is necessary for the ink to sufficiently wet the surface of the transfer medium so that the ink droplet does not drawback in an uncontrolled or random manner. Excessive ink drawback significantly reduces transfixed image quality since the droplet is either randomly spread onto the substrate or fails to transfer properly.

Another aspect of the aqueous transfix process is that the ink becomes partially dried before being transfixed, so the partially dried ink must still be able to transfer easily and completely from image transfer medium to substrate, leaving very little residue behind. Thus, the surface of the image transfer medium must juggle two generally mutually exclusive characteristics—surfaces which are sufficiently wettable tend to resist transfer of the ink to the substrate and surfaces that have good transfer characteristics tend to resist wetting.

There is a need for an aqueous image transfer system and method that balances these two important aspects of the image transfer process for a liquid or aqueous ink system. The system and method must also be capable of initiating and sustaining crashing, aggregating or precipitating of colorants in the liquid or aqueous ink after it is applied to the image transfer medium.

SUMMARY OF THE DISCLOSURE

In one aspect of the present disclosure, a method for transfixing a liquid or aqueous ink image contemplates providing an image transfer medium; applying a layer of particles to the image transfer medium, the particles including an aggregation treatment agent capable of crashing out, aggregating or precipitating colorants, latex and/or resin in liquid ink; applying liquid ink drops to the image transfer medium; initiating crashing aggregating or precipitating of the colorant, latex and/or resin in the ink drops upon contact with the particles; and upon a sufficient amount of crashing aggregating or precipitating, contacting a second substrate to the image transfer medium to transfer the ink from the transfer medium to the second substrate.

In another aspect of the present disclosure, an image transfer medium is provided with a layer of particles on the surface of the medium. The particles includes an aggregation treatment agent capable of crashing out, aggregating or precipitating colorants, latex and/or resin in liquid ink. The aggregation treatment agent may include a metal salt such as iron sulfate or copper sulfate.

DETAILED DESCRIPTION

The present disclosure contemplates a system and method for transfixing a liquid or aqueous ink to a substrate. For purposes of the present disclosure, the ink is an aqueous solution that includes colorants and that is adapted for deposition as droplets onto a surface through conventional means, such as by a plurality of ink jet device controllable to apply the ink droplets in the image pattern. The ink droplets are deposited onto the surface of an image transfer medium or blanket. The blanket may be formed of various materials that are suitable to retain small particles deposited thereon, as explained in more detail herein. For instance, the blanket may be a silicone plate or drum.

In a first step of the method disclosed herein, a large number of small particles are deposited uniformly onto the blanket surface. The particles include agents or compounds suitable to crash out aggregate or precipitate the colorants in the liquid ink. For the purposes of the present disclosure, the term "aggregation treatment agent" is used to refer to these agents or compounds that are capable of aggregating colorants, latex and/or resin out of an ink drop by any suitable mechanism, including but not limited to precipitation. The particles may be very small, on the order of 1.0-10.0 μm in effective diameter and are distributed uniformly and with uniform density onto the blanket surface. In one aspect, the particle coverage or density is low enough (e.g., significantly less than 50%) so that the particles do not form a contiguous large patch of particles. On the other hand, the particle coverage is high enough (e.g., greater than 5%) so that the average distance between the particles is less than a few microns so that many particles are within the range of impact for a drop of ink. Thus, the particle distribution may be in a coverage range of between 5 and about 40%.

The particles may be deposited using a number of techniques, including known electrostatic printing methods such as electrostatically biased roll/brush/cloud development with particles charged through triboelectric charging or ion charging. Another suitable technique is electrostatic precipitation in which an air flow of airborne particles is created across the blanket surface. The particles capture charge from an ion flow perpendicular to the surface generated, for example, by a corotron, and then precipitate onto the blanket surface. Adhesion dusting can be implemented in another approach in which the particles are coarsely dusted onto the blanket surface and then excess particles are removed by light brushing or air flow. Since the particle-to-particle cohesion is weaker than the particle-to-surface cohesion a dense and uniform layer of particles can be produced. This latter method is particularly useful for the particle coverage range set forth above since the method is robust against the particle density being either too high or too low.

Figure 1:
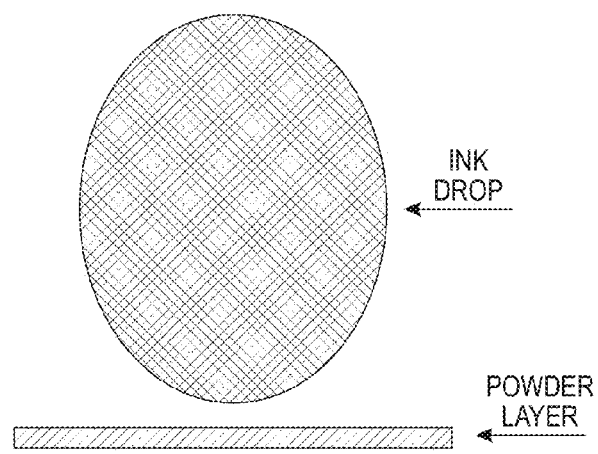
FIG. 1 is diagram of a liquid ink drop applied to a surface of an image transfer medium with a layer of particles capable of crashing aggregating or precipitating colorant in the ink.
Figure 2:
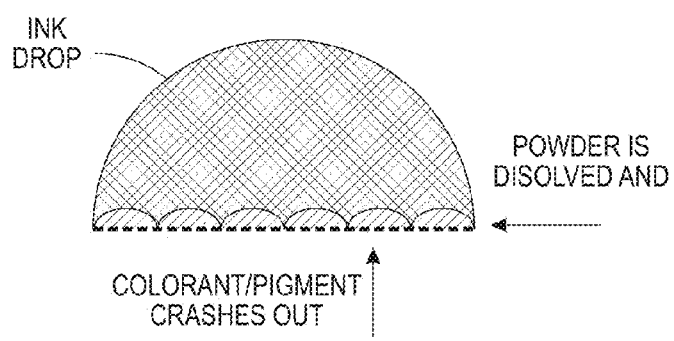
FIG. 2 is a diagram of the ink drop as the colorant is crashed aggregated or precipitated out of the ink.
Figure 3:
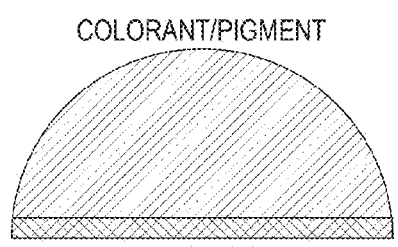
FIG. 3 is a diagram of the ink drop after the colorant as been substantially crashed aggregated or precipitated out of the ink drop by the particles.

In the next step of the method disclosed herein, ink droplets are applied to the layer of particles, as illustrated schematically in FIG. 1. When the droplet of ink strikes the surface, the colorant or pigment begins to precipitate out of the ink due to the aggregation treatment agent(s) within the particles, as represented in FIG. 2. As the precipitation or crashing continues, a coating of pigment and carrier (such as resin or latex) is formed on the blanket surface. The particles further act to pin the droplet to the blanket surface, which has a two-fold impact. First, pinning the droplet to the surface allows the aggregation treatment agent(s) in the particles to diffuse through the droplet and cause further crashing of the ink, as illustrated in FIG. 3.

Figure 4:
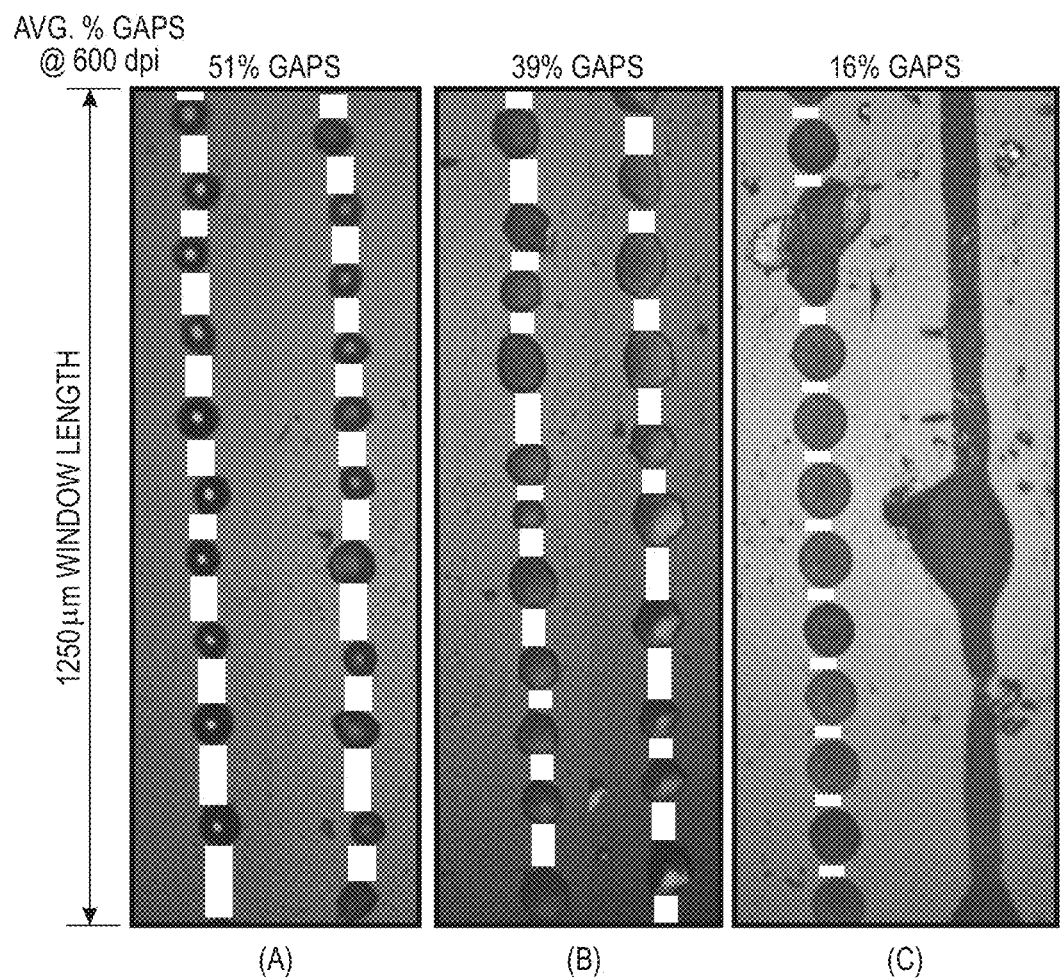
FIG. 4(a) is a photograph of ink drops applied in a linear pattern to the surface of a conventional image transfer medium showing the gaps between the drops.
FIG. 4(b) is a photograph of ink drops applied in a linear pattern to the surface of an image transfer medium in which the surface includes a layer of iron sulfate particles.
FIG. 4(c) is a photograph of ink drops applied in a linear pattern to the surface of an image transfer medium in which the surface includes a layer of copper sulfate particles.

Second, pinning the droplet to the surface prevents it from drawing back, which ensures that the liquid ink is sufficiently dispersed on the transfer medium or blanket so that the quality of the transferred image is maintained. An example of this effect is demonstrated in tests in which ink droplets of about 14 picoliters are deposited on different surfaces, with the results shown in the comparative diagrams of FIG. 4. The control strip of FIG. 4(a) is a standard aqueous ink deposition onto a silicon plate. The ink droplets draw back so that gaps (i.e., the space between droplets) occupy about 51% of each strip. In contrast, the strips of FIGS. 4(b) and (c) were produced by the same aqueous ink applied to surfaces treated as described above. The difference between the two strips is in the aggregation treatment agent of the particles applied to the plate surface. In one case, FIG. 4(b), the gaps occupied only 39% of each strip, while in the other case, FIG. 4(c), the gaps were reduced to only 16% of the strip length.

Figure 5:
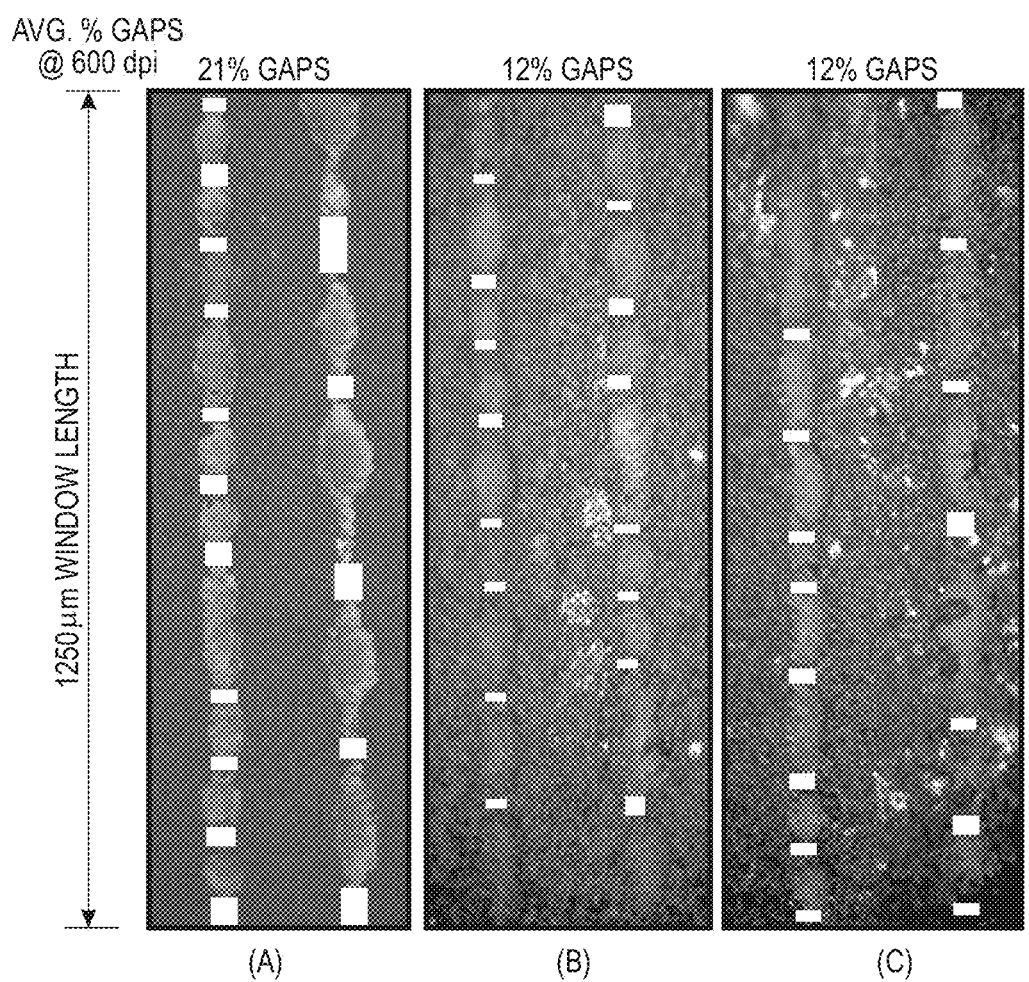
FIG. 5(a) is a photograph of ink drops applied in a linear pattern to the surface of a conventional image transfer medium in which the surface is roughened, the photograph showing the gaps between the drops.
FIG. 5(b) is a photograph of ink drops applied in a linear pattern to the roughened surface of an image transfer medium in which the surface includes a layer of iron sulfate particles.
FIG. 5(c) is a photograph of ink drops applied in a linear pattern to the roughened surface of an image transfer medium in which the surface includes a layer of copper sulfate particles.

A further benefit may be obtained by depositing the particles on a roughened surface. In tests illustrated in the comparative diagrams of FIG. 5, a silicon plate is roughened such as by shot peening. As seen by comparing FIG. 5(a) with FIG. 4(a), the roughened surface yields significantly smaller gaps, 21%, than the smooth surface control test value of 51%. Similar improvements are seen with the prepared surfaces of FIGS. 5(b), (c), with both surfaces producing a small 12% gap.

The particle or powder layer described above may be applied to the surface of an image transfer medium. The ink drops may be applied using an ink jet or other known mechanism for applying ink drops to a surface. When the ink drops strike the surface of the transfer medium, the aggregation treatment agents immediately begin dissolving in the ink and crashing out the pigment. Once the pigment has sufficiently crashed out of the ink and the ink drop has been adequately dried, the image transfer medium can be brought into contact with a second substrate to transfer the color image according to known techniques. Drying of the ink drops can be hastened by applying heat, such as by flowing heated air across the surface of the image transfer medium. The system and method described herein improves the image transfer characteristics for an aqueous color ink so that the resulting transferred image is sharper and more complete than with prior systems and methods.

As indicated above, the particles or powder contain agents or compounds that cause pigment and/or resin and/or latex to crash out of the ink drop to produce a color drop on the receiving substrate. In the tests documented in FIGS. 4-5 the particles were iron sulfate and copper sulfate, with the copper sulfate showing the narrower gaps in FIG. 4(c). It is contemplated that the particle agents may include other metal salts with metal ions selected from Ca, Cu, Ni, Mg, Zn, Fe and Al. It is further believed that certain anions may also be suitable to crash out pigments, resin and/or latex from an ink drop. These anions may include Cl, $NO_3$, $SO_4$, I, Br, $ClO_3$ and RCOO—, where R is an alkyl group.

The aggregation treatment agents may be combined with other additives to form the particles or powders described above. For instance, a surfactant may be incorporated into the particles or separate surfactant particles may be mixed with particles of the aggregation treatment agent. The surfactant may dissolve in the ink drop to reduce the surface tension of the drop at contact. Reducing surface tension can improve surface wetting, thereby reducing the gap between successive ink drops on the image transfer medium.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A method for transferring an ink image comprising:
providing an image transfer medium;
applying a layer of particles to the image transfer medium, the particles including an aggregation treatment agent capable of aggregating colorants, latex and/or resin in liquid ink;
applying one or more liquid ink drops to the image transfer medium;
initiating crashing of the colorant, latex and/or resin in the ink drops upon contact with the particles;
initiating drying of the colorant, latex and/or resin; and
upon a sufficient amount of aggregation and drying, contacting a second substrate to the image transfer medium to transfer the ink from the transfer medium to the second substrate.

2. The method for transferring an ink image of claim 1, wherein the aggregation treatment agent includes a metal salt.

3. The method for transferring an ink image of claim 2, wherein the metal salt includes metal ions selected from the group Ca, Cu, Ni, Mg, Zn, Fe and Al.

4. The method for transferring an ink image of claim 3, wherein the particles include one or more of copper sulfate and iron sulfate.

5. The method for transferring an ink image of claim 2, wherein the particles include a surfactant.

6. The method for transferring an ink image of claim 1, wherein the aggregation treatment agent includes an anion capable of crashing the colorant, latex and/or resin.

7. The method for transferring an ink image of claim 6, wherein the aggregation treatment agent includes anions containing one or more of $NO_3$, $SO_4$, I, Br, $ClO_3$ and RCOO—, where R is an alkyl group.

8. The method for transferring an ink image of claim 1, wherein the step of applying a layer of particles includes depositing the particles substantially uniformly with substantially uniform density on the surface of the image transfer medium.

9. The method for transferring an ink image of claim 1, wherein the particles have a diameter of 1.0-10.0 µm.

10. The method for transferring an ink image of claim 1, wherein the particles are deposited on the image transfer medium by one or more of the techniques including triboelectric or ion charging, electrostatic precipitation and adhesion dusting.

11. The method for transferring an ink image of claim 1, further comprising providing a roughened surface on the image transfer medium before the step of applying a layer of particles.

* * * * *